US008490989B2

(12) United States Patent
Piehl et al.

(10) Patent No.: US 8,490,989 B2
(45) Date of Patent: Jul. 23, 2013

(54) HEAVY-DUTY AXLE-TO-BEAM CONNECTION

(75) Inventors: Daniel J. Piehl, Mitchell, SD (US); Kevin J. Erdmann, Mitchell, SD (US)

(73) Assignee: Hendrickson USA, L.L.C., Itasca (IL)

( * ) Notice: Subject to any disclaimer, the term of this patent is extended or adjusted under 35 U.S.C. 154(b) by 337 days.

(21) Appl. No.: 12/912,240

(22) Filed: Oct. 26, 2010

(65) Prior Publication Data

US 2011/0095501 A1  Apr. 28, 2011

Related U.S. Application Data

(60) Provisional application No. 61/254,863, filed on Oct. 26, 2009.

(51) Int. Cl.
*B60G 9/00* (2006.01)
*B60G 9/02* (2006.01)
*B60G 7/00* (2006.01)

(52) U.S. Cl.
USPC ........ 280/124.11; 280/124.116; 280/124.128; 280/124.153; 301/124.1

(58) Field of Classification Search
USPC ....... 280/124.11, 124.116, 124.128, 124.153, 280/124.156; 301/124.1, 125
See application file for complete search history.

(56) References Cited

U.S. PATENT DOCUMENTS

| | | | |
|---|---|---|---|
| 3,861,708 A | 1/1975 | Fier | |
| 4,615,539 A | 10/1986 | Pierce | |
| 4,858,949 A | 8/1989 | Wallace et al. | |
| 5,039,124 A | 8/1991 | Widmer | |
| 5,112,078 A | 5/1992 | Galazin et al. | |
| 5,116,075 A | 5/1992 | Pierce | |
| 5,366,237 A | 11/1994 | Dilling et al. | |
| 5,375,871 A | 12/1994 | Mitchell et al. | |
| 5,476,251 A | 12/1995 | Moses et al. | |
| 5,639,110 A | 6/1997 | Pierce et al. | |
| 5,690,353 A | 11/1997 | Vandenberg | |
| 6,508,482 B2 | 1/2003 | Pierce et al. | |
| 6,827,360 B2 * | 12/2004 | Chan et al. | 280/124.116 |
| 7,007,960 B2 * | 3/2006 | Chalin et al. | 280/124.116 |
| 7,267,348 B1 * | 9/2007 | Klein et al. | 280/124.128 |
| 2001/0020775 A1 | 9/2001 | Pierce et al. | |
| 2006/0033304 A1 | 2/2006 | Saieg et al. | |
| 2006/0163834 A1 | 7/2006 | Brereton et al. | |
| 2009/0072505 A1 | 3/2009 | McGinnis | |

FOREIGN PATENT DOCUMENTS

DE  3119022  12/1982

* cited by examiner

*Primary Examiner* — Joseph Rocca
*Assistant Examiner* — Joselynn Y Sliteris
(74) *Attorney, Agent, or Firm* — Dureska, Kennedy & Moore, L.L.C.; David P. Dureska; Brent L. Moore

(57) ABSTRACT

An axle-to-beam connection for axle/suspension systems includes a connector having a U-shaped cross section and includes two pairs of legs. Each of the legs is formed with an opening. The connector extends longitudinally along the axle and is also formed with a pair of window weld openings adjacent to the axle. The connector provides a conforming fit of the connector to the axle when the connector is pulled over the axle using the leg openings and is attached to the axle and beam of the axle/suspension system.

15 Claims, 14 Drawing Sheets

HEAVY-DUTY AXLE-TO-BEAM CONNECTION

CROSS-REFERENCE TO RELATED APPLICATION

This application claims the benefit of U.S. Provisional Patent Application Ser. No. 61/254,863, filed Oct. 26, 2009.

BACKGROUND OF THE INVENTION

1. Field of the Invention

The invention relates to vehicle axle/suspension systems, and in particular to the suspension assemblies of those systems which are useful for heavy-duty vehicles such as trucks and tractor-trailers. More particularly, the invention is directed to a heavy-duty trailing or leading arm rigid beam-type suspension assembly for trucks and tractor-trailers, in which the axle is securely and efficiently captured by the beams and an improved connector which is formed generally in the shape of the covered portion of a covered wagon. This connector structure, together with the manner in which the structure is placed on or attached to the axle and the beam, results in a lightweight, economical, sturdy and rigid axle-to-beam connection that eliminates U-bolts, U-bolt brackets/axle seats and associated hardware typically used in many prior art axle-to-beam connection designs, provides a more robust axle-to-beam connection and allows for greater flexibility in S-cam orientation over prior art U-bolt axle-to-beam connection designs.

2. Background Art

The use of air-ride trailing and leading arm rigid beam-type axle/suspension systems has been very popular in the heavy-duty truck and tractor-trailer industry for many years. Air-ride trailing and leading arm spring beam-type axle/suspension systems also are often used in the industry. Although such axle/suspension systems can be found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a sub frame, and the suspension assemblies connect directly to the subframe. For those heavy-duty vehicles that support a subframe, the subframe can be non-moveable or moveable, the latter being commonly referred to as a slider box, slider subframe, slider undercarriage, or secondary slider frame. For the purpose of convenience and clarity, reference herein will be made to a slider, with the understanding that such reference is by way of example, and that the present invention applies to heavy-duty vehicle axle/suspension systems suspended from primary frames, moveable subframes, and non-movable subframes.

Specifically, each suspension assembly of an axle/suspension system, includes a longitudinally extending elongated beam. Each beam is located adjacent to and below a respective one of a pair of spaced-apart longitudinally extending main members of the slider. More specifically, each beam is pivotally connected at one of its ends to a hanger which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The opposite end of each beam also is connected to a bellows air spring or its equivalent, which in turn is connected to a respective one of the frame main members. A brake assembly and shock absorber also are mounted on each of the beams and/or axle. A height control valve is mounted on the hanger and is operatively connected to the beam in order to maintain the ride height of the vehicle. The beam may extend rearwardly or frontwardly from the pivotal connection relative to the front of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The beam on which the axle is mounted is typically either a top-mount/overslung beam or a bottom-mount/underslung beam. An axle is mounted on the top of and is supported by the bottom-mount/underslung beam-type, with generally an upper portion of the axle being exposed. Welding alone typically is inadequate to maintain the integrity of the rigid axle-to-beam connection for underslung beams due to certain loads to which the axle-to-beam connection is subjected during vehicle operation. Therefore, underslung axle-to-beam mounts must be fortified in some manner to maintain the mount integrity and prevent separation of the axle from the beams. Such fortification usually includes additional mounting hardware such as U-bolts, U-bolt brackets/axle seats and the like, resulting in a secure axle-to-beam connection more capable of withstanding operational loads. However, such hardware usually adds unwanted cost, weight and maintenance to the axle/suspension system.

Conversely, an axle is mounted on the bottom of a top-mount/overslung beam, with generally a lower portion of the axle being exposed. The majority of axle/suspension systems in commercial use today that are generally free of significant additional axle mounting hardware utilize top mount beams because of packaging constraints. (The Assignee of the present application is the owner of at least two such patents: U.S. Pat. No. 5,366,237 and U.S. Pat. No. 6,508,482; which describe axle/suspension systems that are generally free of additional axle mounting hardware of the types described hereinabove, including, U-bolts, U-bolt brackets/axle seats and the like.) Many axle/suspension systems that use top-mount beams also augment the axle-to-beam weld mounts with additional mounting hardware, but again, sacrifice weight advantages as well as cost and maintenance efficiencies.

Therefore, a need exists in the art for an improved axle-to-beam connection for axle/suspension systems which utilizes a bracket or connector that replaces prior art U-bolts, U-bolt brackets/axle seats and the like, and which utilizes a new and improved method for attaching or placing the connector onto the axle and the beam in order to form the axle-to-beam connection. By replacing the mounting hardware, the improved axle-to-beam connection reduces weight and improves cost and maintenance efficiencies.

SUMMARY OF THE INVENTION

Objectives of the present invention include providing an axle-to-beam connection for axle/suspension systems which utilizes a bracket or connector that replaces prior art U-bolts, U-bolt brackets/axle seats and the like.

Another objective of the present invention is to provide an axle-to-beam connection for axle/suspension systems which utilizes a new and improved method for attaching or placing the connector onto the axle and the beam in order to form the axle-to-beam connection. Yet another objective of the present invention is to provide an axle-to-beam connection for axle/ suspension systems that is more robust than prior art axle-to-beam connection designs that utilize U-bolts, U-bolt brackets/axle seats and their associated hardware by broadening the area of axle support.

Yet even another objective of the present invention is to provide a method for creating an axle-to-beam connection for axle/suspension systems that minimizes gaps in the axle-to-beam connection caused by inconsistencies in the outer surface of the axle.

A further objective of the present invention is to provide an axle-to-beam connection for axle/suspension systems that replaces U-bolts, U-bolt brackets/axle seats and their associated hardware, resulting in an axle-to-beam connection that uses fewer components, and reduces weight as well as costs associated with installation and maintenance of the U-bolts, U-bolt brackets/axle seats and their associated hardware.

An even further objective of the present invention is to provide an axle-to-beam connection for axle/suspension systems that allows for greater flexibility in orientating the S-cam of the axle/suspension system over systems that utilize the prior art U-bolt and U-bolt bracket/axle seat hardware and the like.

Yet even a further objective of the present invention is to provide an axle-to-beam connection for axle/suspension systems that allows for more efficient manufacture of the axle-to-beam connection because the connection includes fewer parts than prior art axle-to-beam connections that utilize U-bolts, U-bolt brackets/axle seats and the like. This increased manufacturing efficiency can potentially lead to increased manufacturing production and greater flexibility to utilize automated manufacturing processes, which can in turn potentially lead to an even greater increase in overall production.

These objectives and advantages are obtained by the axle-to-beam connection for axle/suspension systems of the present invention which includes an axle, a beam, and a connector disposed about the axle and formed with at least one window weld opening adjacent the axle. The connector is attached to the axle via a weld disposed along an interface between the window weld opening and the axle. The connector includes a first leg and a second leg, the first leg disposed generally adjacent a front portion of the axle and the second leg disposed generally adjacent a rear portion of the axle. Each one of the first and second legs are attached to the beam.

These objectives and advantages are also obtained by the method for forming an axle-to-beam connection for an axle/suspension system of the present invention that includes the following steps: a) placing an axle into an axle locus formed in a beam; b) placing a connector over said axle at said beam axle locus; c) pulling the connector onto the axle and the beam to create a conforming fit between the axle and the connector; d) attaching the connector to the beam; and e) attaching the connector to the axle.

These objectives and advantages are also obtained by the method for forming an axle-to-beam connection for an axle/suspension system of the present invention that includes the following steps: a) placing an axle into an axle locus formed in a beam; b) placing a connector over said axle at said beam axle locus; c) pulling the connector onto the axle and the beam to create a conforming lit between the axle and the connector; d) attaching the connector to the axle; and e) attaching the connector to the beam.

BRIEF DESCRIPTION OF THE SEVERAL
VIEWS OF THE DRAWINGS

The preferred embodiments of the present invention, illustrative of the best modes in which applicants have contemplated applying the principles, are set forth in the following description and are shown in the drawings, and are particularly and distinctly pointed out and set forth in the appended claims.

Figure 5:
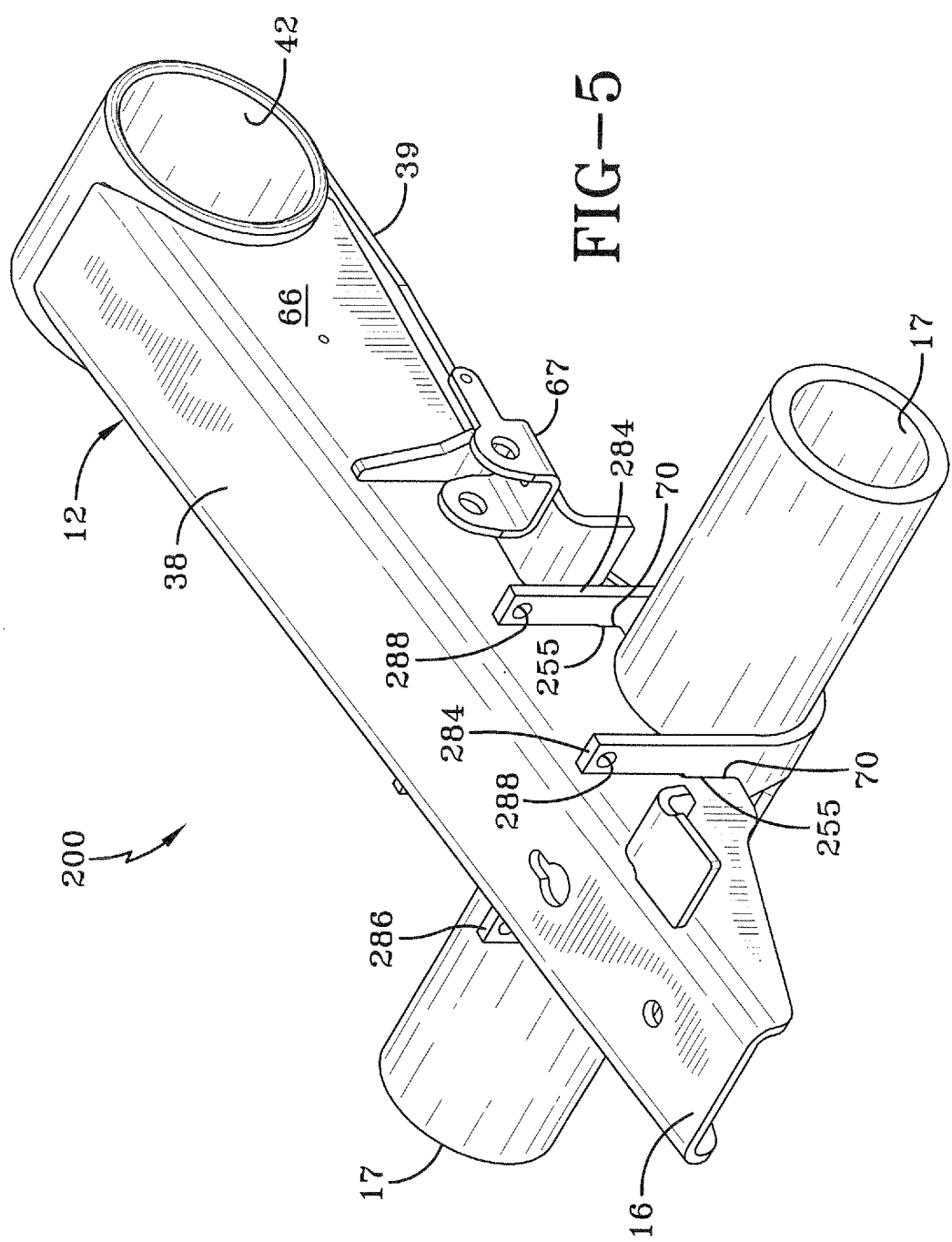
FIG. 5 is a top rear inboard perspective view of a first preferred embodiment axle-to-beam connection for axle/suspension systems of the present invention, showing the axle captured by the overslung/top-mount beam and the connector, and also showing the upwardly extending inboard legs of the connector attached to the inboard sidewall of the beam.
Figure 7:
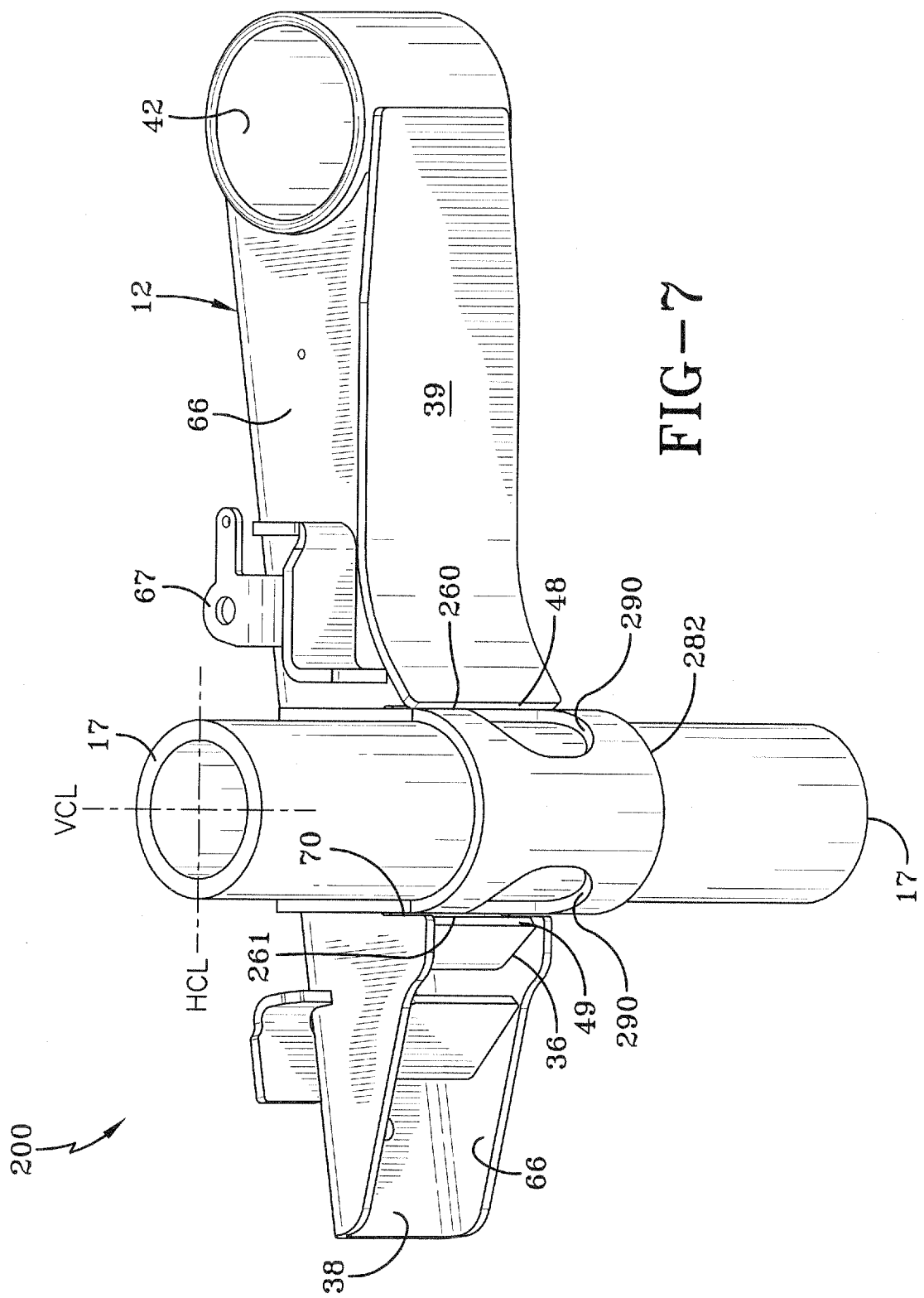
Figure 8:
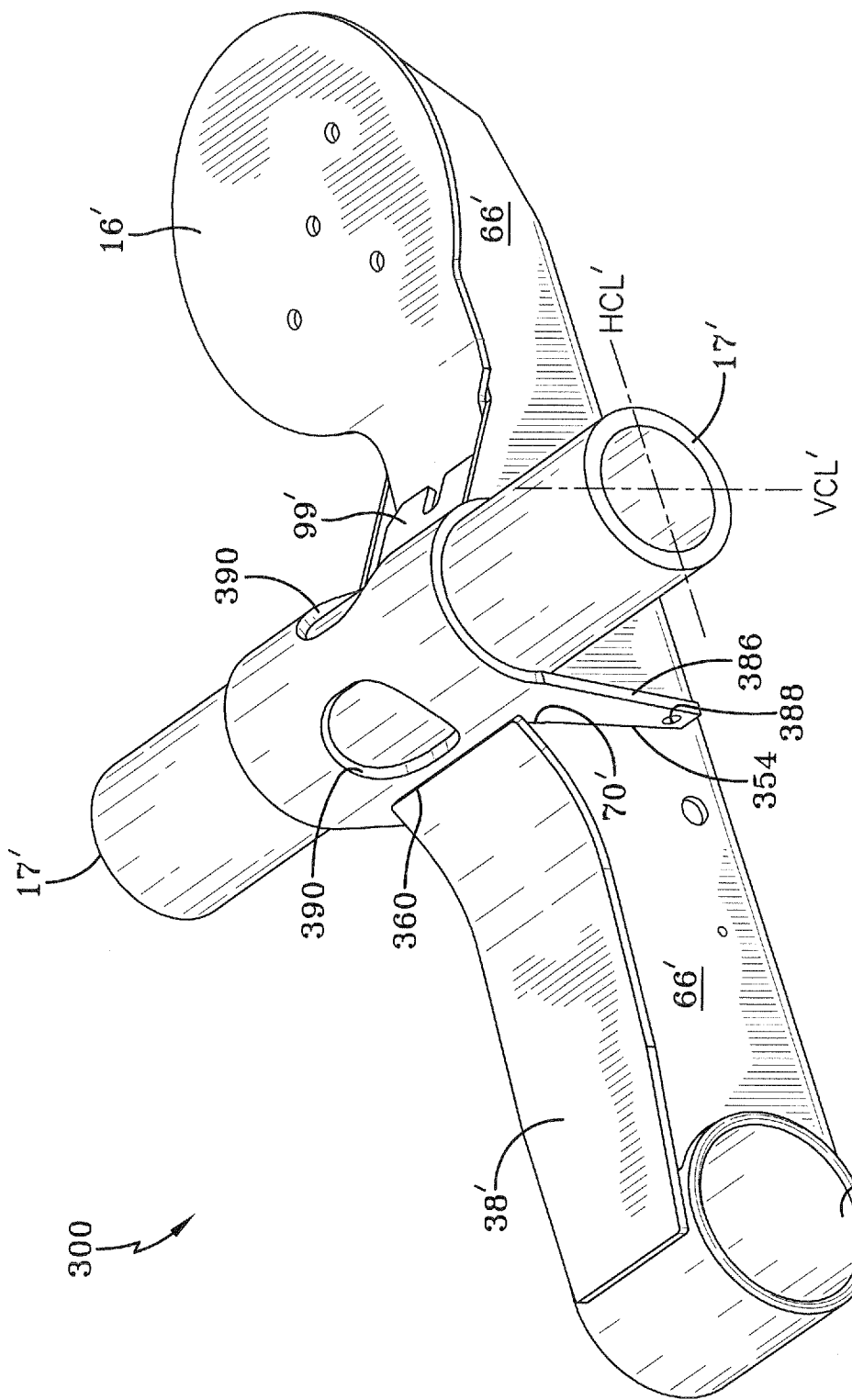
Figure 9:
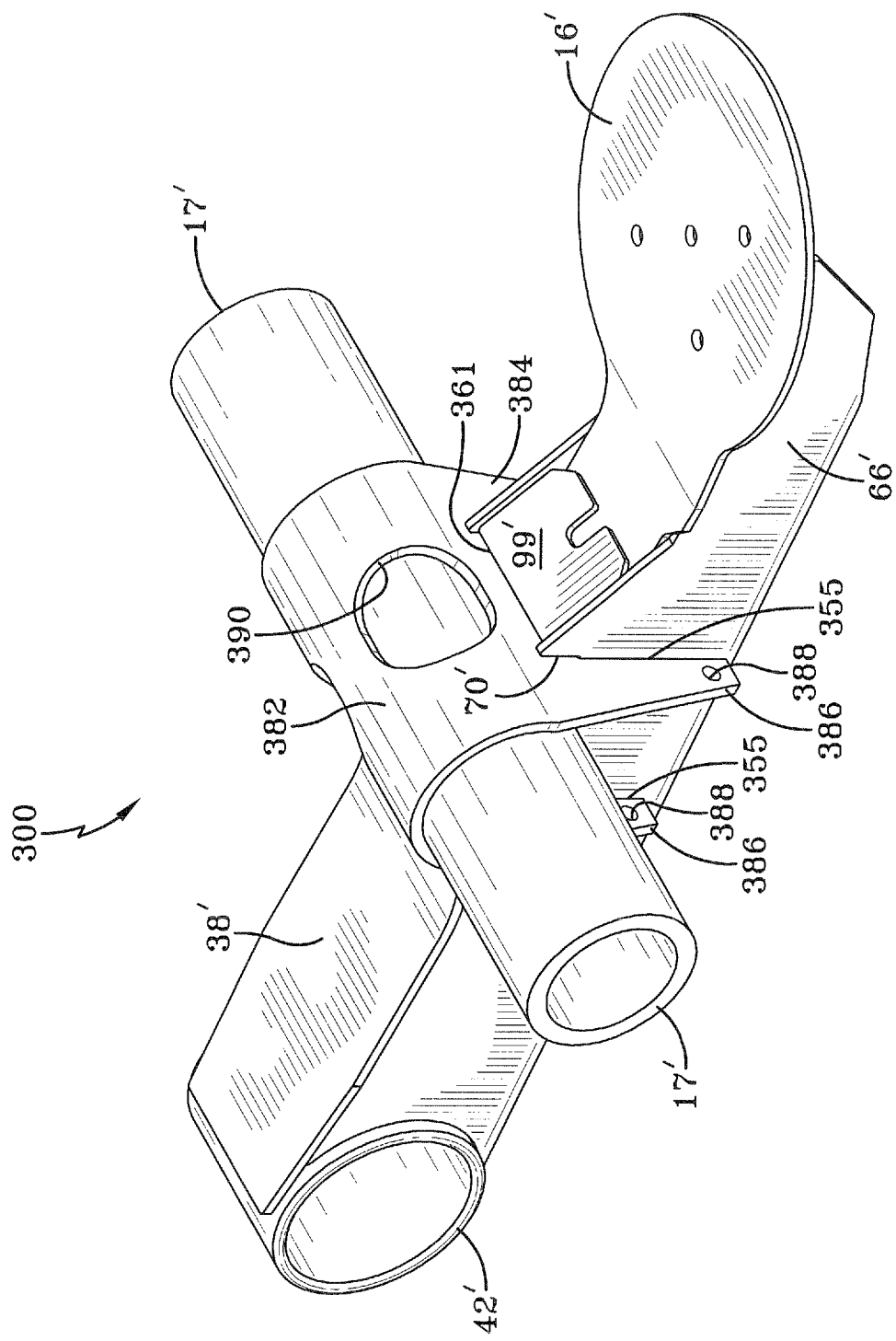
Figure 10:
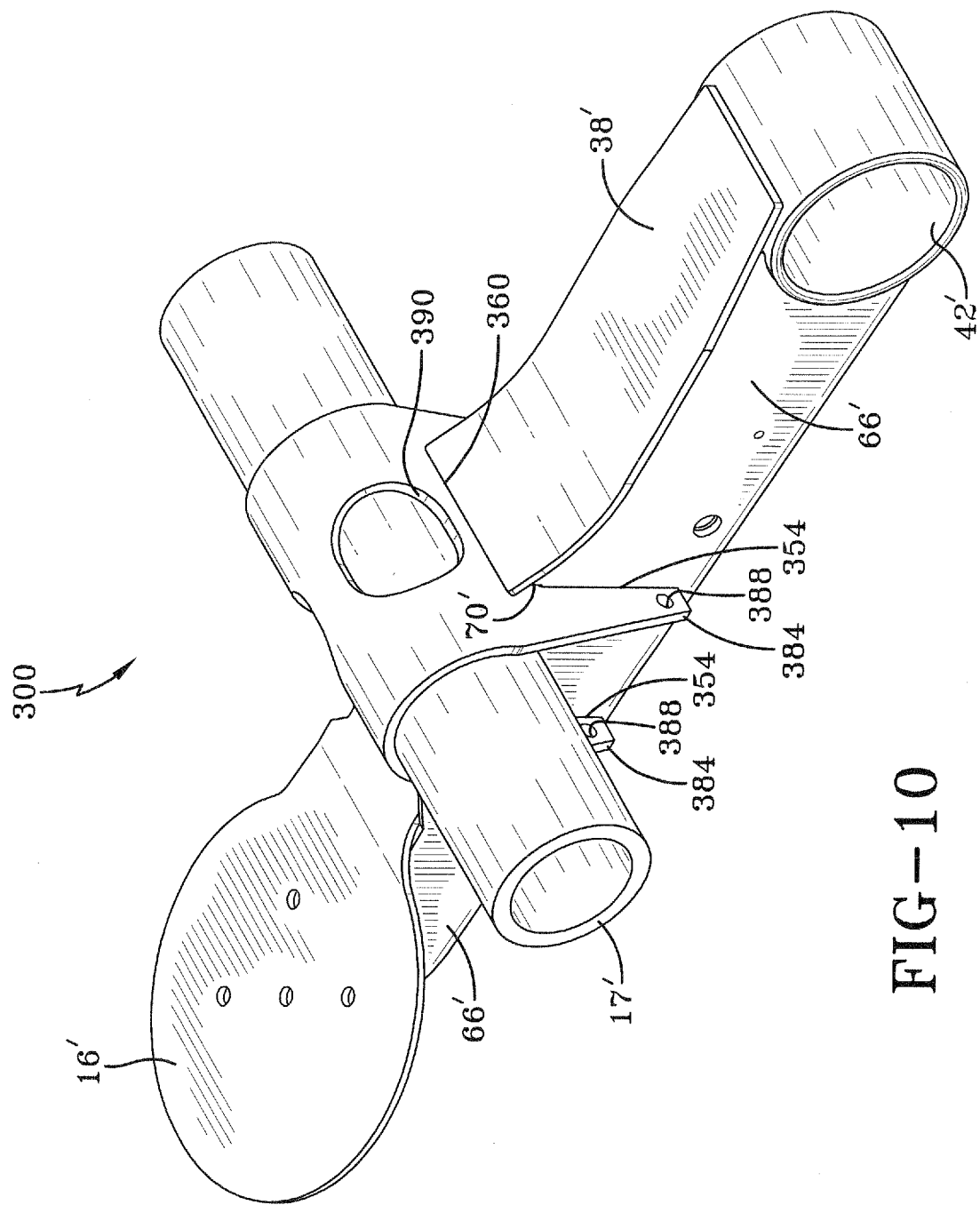

FIG. 7 is a bottom rear inboard perspective view of the first preferred embodiment axle-to-beam connection for axle/suspension systems of the present invention shown in FIG. 5, showing the axle captured by the overslung/top-mount beam and the connector, and also showing a pair of openings or windows formed in the connector in which a continuous weld (not shown) is laid for attaching the connector to the axle;

FIG. 8 is a top front outboard perspective view of a second preferred embodiment axle-to-beam connection for axle/suspension systems of the present invention, showing the axle captured by the underslung/bottom-mount beam and the connector, and also showing one of the downwardly extending outboard legs of the connector attached to the outboard sidewall of the beam;

FIG. 9 is a top rear outboard perspective view of the second embodiment axle-to-beam connection for axle/suspension systems of the present invention shown in FIG. 8, showing the axle captured by the underslung/bottom-mount beam and the connector, and showing the downwardly extending outboard legs of the connector attached to the outboard sidewall of the beam, and further showing the rear window formed in the connector in which a continuous weld (not shown) is laid for attaching the connector to the axle, and also showing the rear angle plate of the beam attached to the connector; and FIG. 10 is a top front inboard perspective view of the second preferred embodiment axle-to-beam connection for axle/suspension systems of the present invention shown in FIG. 8, showing the axle captured by the underslung/bottom-mount beam and the connector, and showing the downwardly extending inboard legs of the connector attached to the inboard sidewall of the beam, and further showing the front window formed in the connector in which a continuous weld (not shown) is laid for attaching the connector to the axle.

Similar numerals refer to similar parts throughout the drawings.

DESCRIPTION OF THE PREFERRED EMBODIMENT

So that the environment in which the new and improved axle-to-beam connection of the present invention is utilized can be best understood, two axle/suspension systems are described immediately below, one which incorporates a prior art overslung/top-mount beam configuration and the other which incorporates a prior art underslung/bottom-mount beam configuration, both of which use conventional prior art axle-to-beam connection structures and methods including welds, U-bolts, U-bolt brackets/axle seats and their associated hardware.

Figure 1:
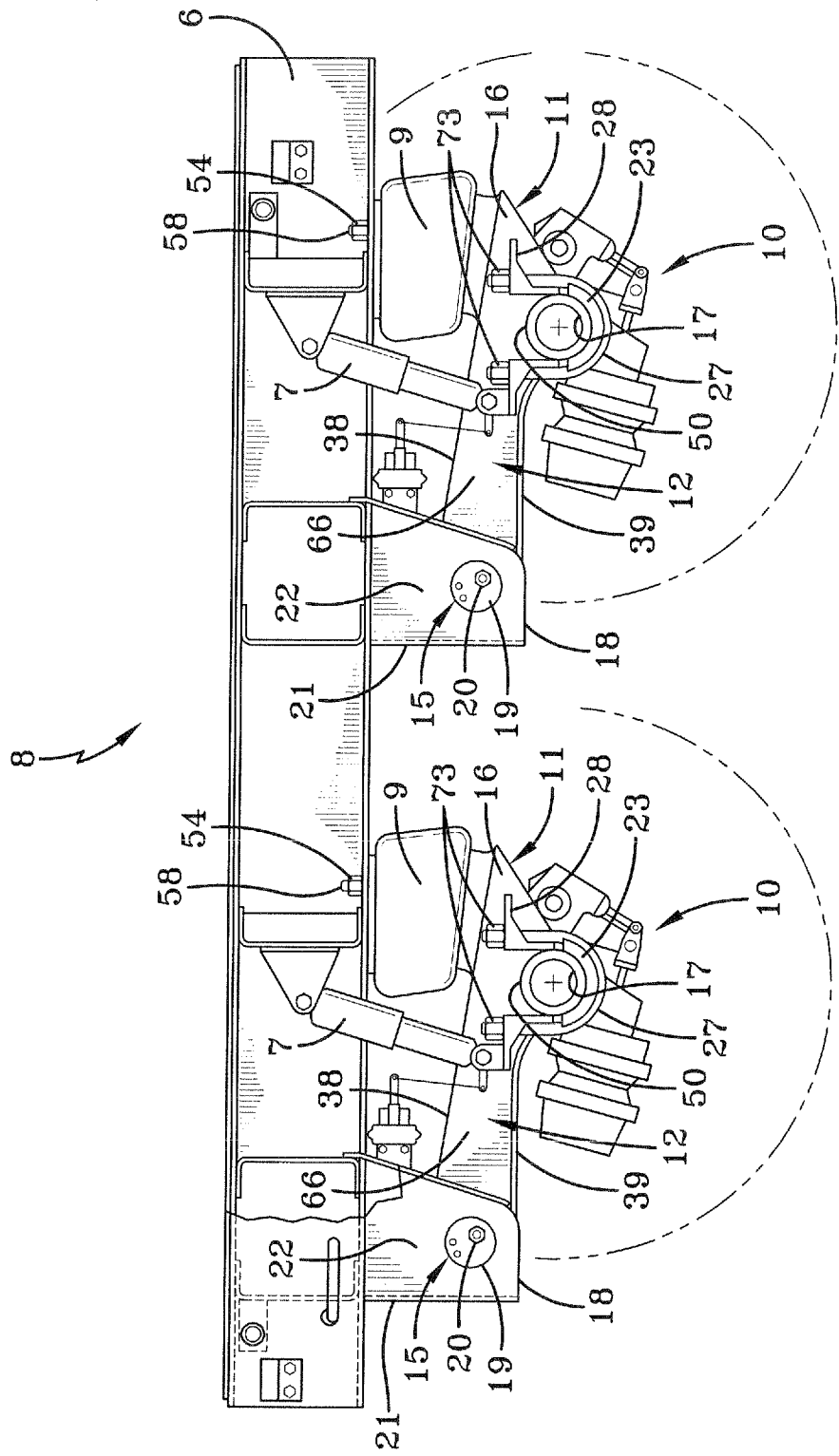
FIG. 1 is an elevational view of a slider for a tractor-trailer incorporating a pair of prior art trailing arm air-ride beam-type axle/suspension systems, showing the overslung/top-mount beams of each axle/suspension system capturing an axle utilizing prior art axle-to-beam connections including welds (not shown), U-bolts and U-bolt brackets/axle seats.

A pair of prior art air-ride trailing arm rigid overslung/top-mount beam-type axle/suspension systems are each indicated generally by reference numeral 10 and are shown in FIG. 1 incorporated into a slider 8 of a tractor-trailer. Axle/suspension system 10 is the subject of U.S. Pat. No. 5,037,126, is available from the assignee of the present invention, and is commercially sold as the HT Series Suspension System. Inasmuch as slider 8 includes an identical pair of axle/suspension systems 10 mounted on the slider, only one of the axle/suspension systems will be described herein. Moreover, inasmuch as axle/suspension system 10 comprises an identical pair of suspension assemblies 11 mounted on a pair of transversely spaced frame hangers 18 depending from slider 8 for mounting an axle 17, only one of the suspension assemblies will be described herein.

Figure 2:
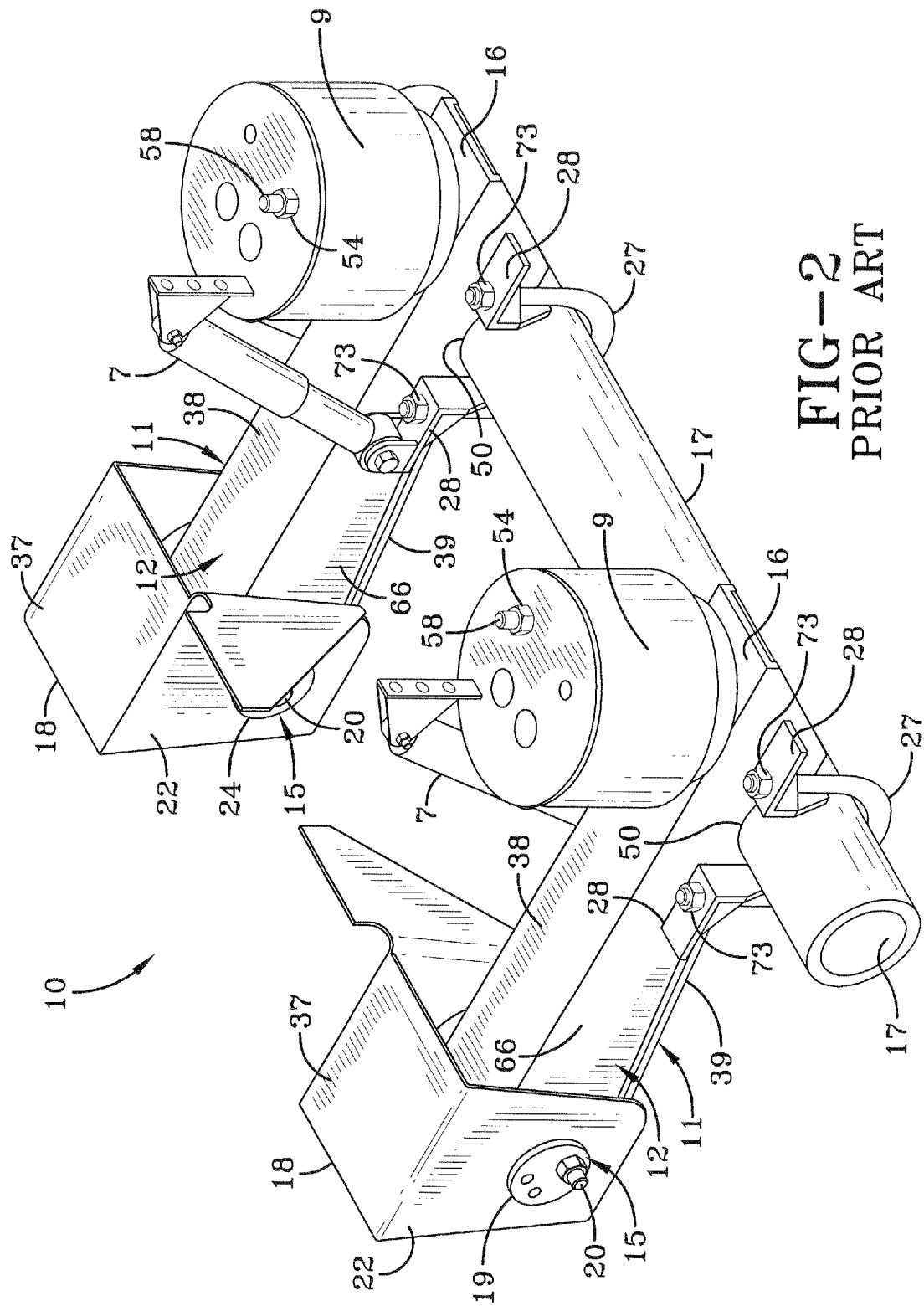
FIG. 2 is a top rear driver-side perspective view of one of the prior art axle/suspension systems shown in FIG. 1 pivotally attached to a pair of hangers, showing each of the overslung/top-mount beams capturing the axle utilizing prior art axle-to-beam connections including welds (not shown), U-bolts and U-bolt brackets/axle seats.
Figure 2A:
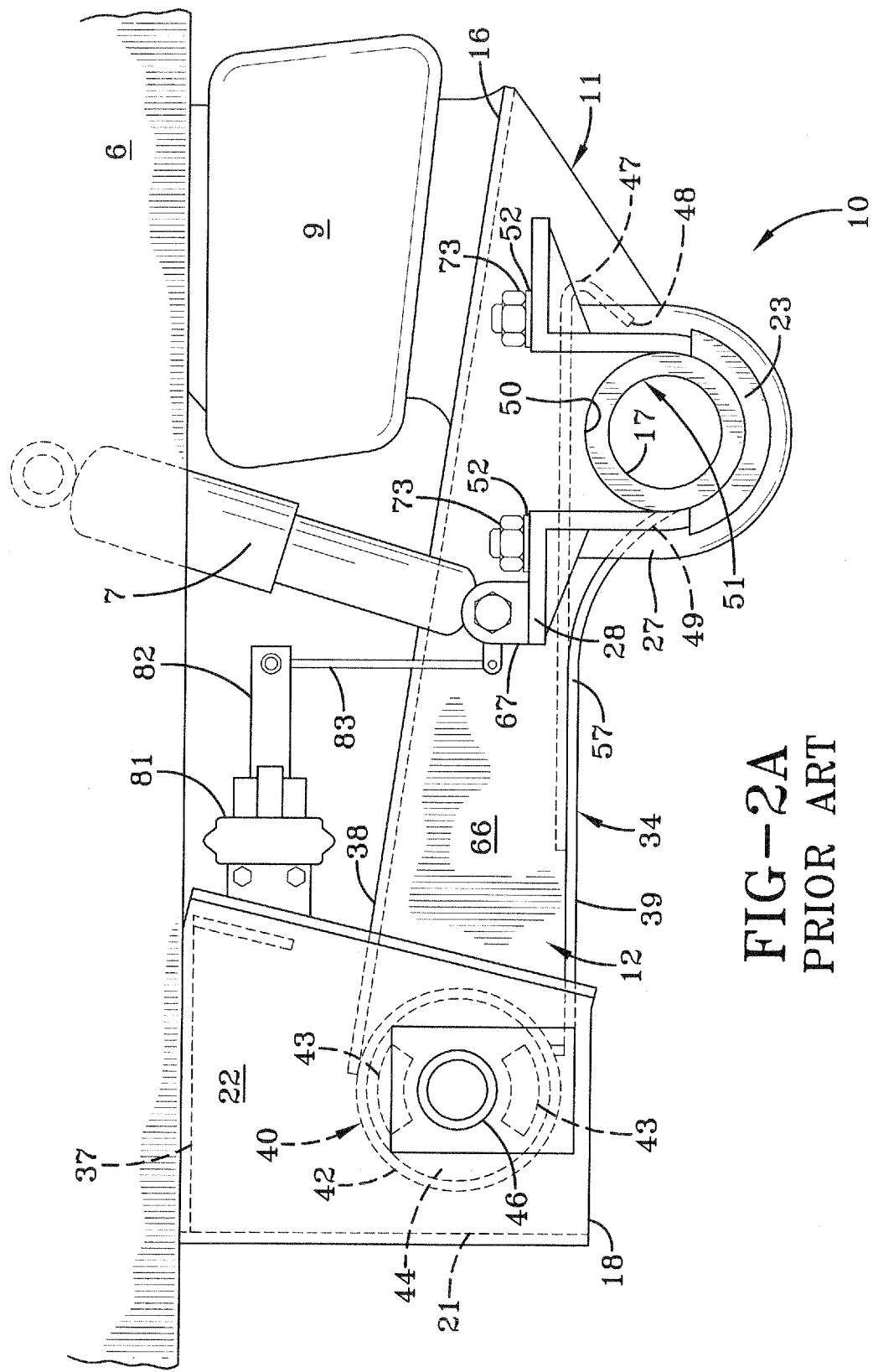
FIG. 2A is an elevational view of the prior art axle/suspension system shown in FIG. 2, showing one of the pair of suspension assemblies mounted on a vehicle frame with hidden portions represented by broken lines, and showing the overslung/top-mount beam capturing the axle utilizing prior art axle-to-beam connections including welds (not shown), U-bolts and U-bolt brackets/axle seats.

With additional reference to FIGS. 2 and 2A, suspension assembly 11 includes a trailing arm or beam 12 which is a generally rigid metal box-like structure comprising a pair of transversely spaced vertically extending sidewalls 66, which are interconnected by horizontally extending top and bottom plates 38 and 39, respectively. Sidewalls 66 and top plate 38 are formed as a one-piece structure having a generally inverted U-shape. Bottom plate 39 is welded to sidewalls 66 to complete the general structure of beam 12. A more detailed description of beam 12 is set forth below. The front end of beam 12 includes a bushing assembly 40 (FIG. 2A) of a type which is well known in the heavy-duty axle/suspension system art. The bushing assembly includes a mounting tube 42 formed of robust steel and an elastomeric bushing 44 press fit into the tube. The bushing 44 is molded about and adhesively attached to a central metal sleeve 46 formed with a continuous opening. Sleeve 46 passes completely through bushing 44 and extends outwardly from the sidewalls thereof to facilitate pivotal mounting of beam 12 on slider 8, which will be described in greater detail hereinbelow. As is well known in the art, the durometer of elastomeric bushing 44 can be varied depending on the application and the bushing deflection properties desired. To generally achieve a softer ride in the vertical direction and a stiffer ride in the fore-aft direction, bushing 44 is formed with a pair of vertically-spaced voids 43 in each of its sidewalls.

A platform 16 extends from the rear end of trailing beam 12 for supporting a conventional bellows-type air spring 9, which extends between and is attached to platform 16 and a main member 6 of slider 8 (FIGS. 1 and 2A). A shock absorber 7 also is attached to and extends between beam 12 and main member 6 of slider 8 at selected locations to complete the major components of suspension assembly 11. Axle 17 extends between and is rigidly connected to the rear end of each beam 12 by welds (not shown) and by structural components including beam U-bolts 27 and U-bolt brackets/axle seats 28, as will be described in greater detail below. U-bolt brackets/axle seats 28 are connected to inboard and outboard sidewalls 66 of beam 12 by conventional means such as welding.

Suspension assembly beam 12 is pivotally mounted on main member 6 of slider 8 via frame hanger 18 which depends from and is secured to the main member by any conventional means such as welds. Frame hanger 18 typically is a generally box-like sturdy steel structure having a vertically extending front wall 21 and a top wall 37, which are each attached to and extend between a pair of vertically extending sidewalls 22 (FIGS. 2-2A). A fastener assembly 15 includes a bolt 20 which passes through an eccentric washer 19 and a washer 24, with the eccentric washer being located adjacent the outboard surface of outboard sidewall 22 of hanger 18 and washer 24 being located adjacent the inboard surface of inboard sidewall 22 of the hanger, a pair of aligned openings (not shown) formed in hanger sidewalls 22, a pair of aligned openings formed in a pair of conventional spacer discs (not shown), and the aligned continuous opening of bushing sleeve 46. Each spacer disc typically is formed of ultra-high molecular weight polyethylene, and is disposed about bushing mounting tube 42 between a respective one of hanger sidewalls 22 and bushing 44, to insulate against metal-to-metal contact between the mounting tube and the hanger sidewalls. Eccentric washer 19 provides a means for adjusting alignment of axle/suspension system 10.

Figure 2B:
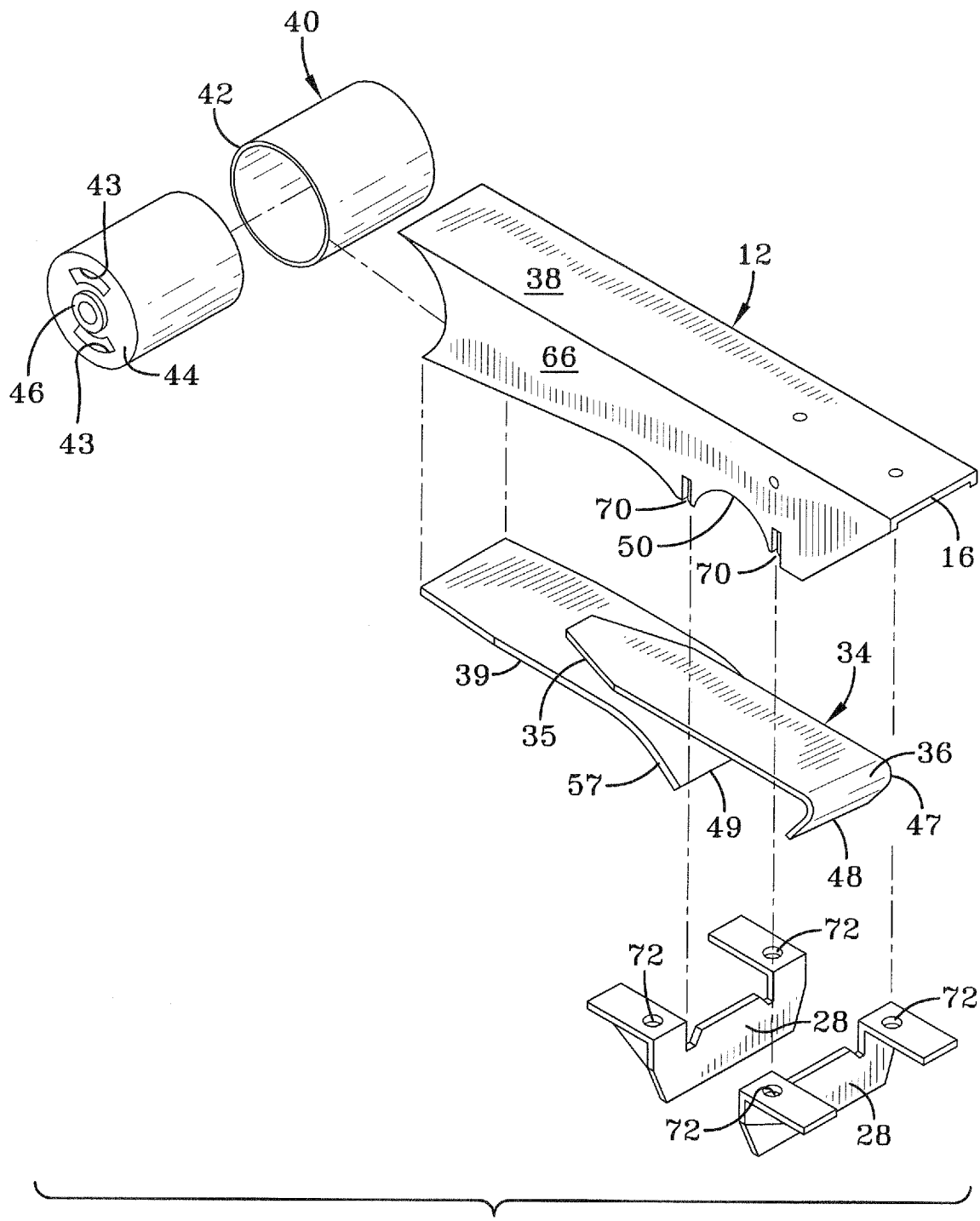
FIG. 2B is an exploded view of the component parts of the beam construction of the suspension assembly shown in FIG. 2A, and showing the U-bolt bracket/axle scats and the component parts of the overslung/top-mount beam.
Figure 2C:
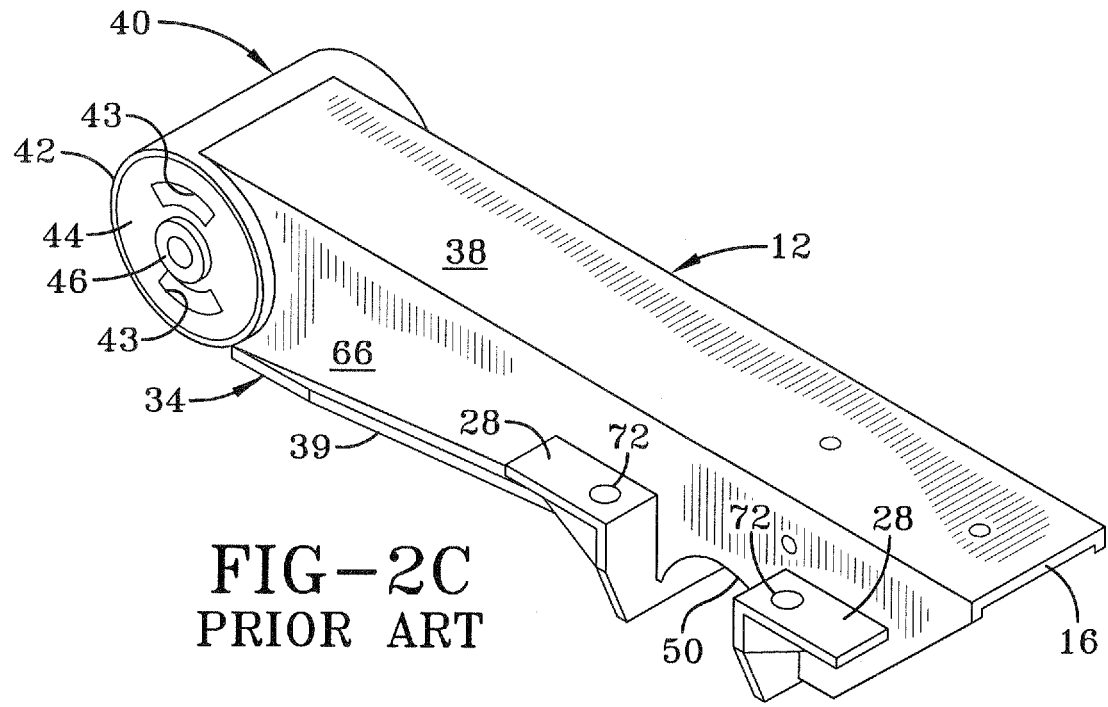
FIG. 2C is a perspective view of the assembled component parts shown in FIG. 2B.
Figure 2D:
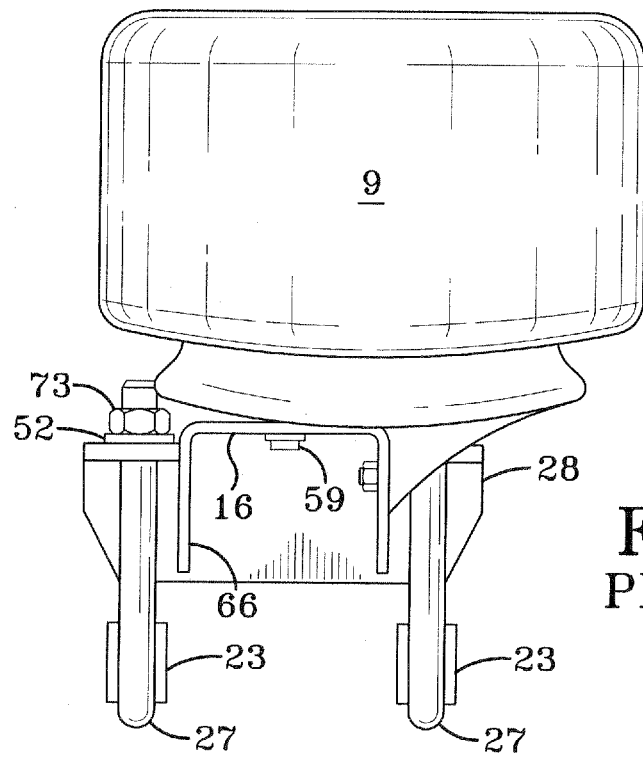
FIG. 2D is an end view taken along lines A-A of FIG. 2A of one of the pair of suspension assemblies, showing the overslung/top-mount beam capturing the axle utilizing prior art axle-to-beam connections including welds (not shown) U-bolts and U-bolt brackets/axle seats.

Turning now to FIGS. 2B, 2C and 2D, beam 12 generally comprises seven component parts, including sidewalls 66, integral top plate 38, first bottom plate 39, a second bottom plate 36, and U-bolt brackets/axle seats 28. As set forth above, opposing sidewalls 66 and top plate 38 form a one-piece generally inverted U-shaped member. This U-shaped member is formed by a stamping and/or bending process. First bottom plate 39 and second bottom plate 36 are secured together by welding along adjacent interface 35 to form a rigid beam bottom member 34. Beam bottom member 34 is rigidly secured to the open end of the U-shaped member, and along sidewalls 66 and, thus, opposite and spaced from top plate 38.

U-bolt brackets/axle seats 28 nest in and are rigidly secured to grooves 70 formed in opposing sidewalls 66 of beam 12, by welding. An arch 50 (only one shown) is formed in the lower edge of each of sidewalls 66 between grooves 70. Second bottom plate 36 is formed with a bend 47 adjacent an end 48 opposite from the bushing assembly end of the plate. First bottom plate 39 is also formed with a bend 57 adjacent an end 49 opposite from the bushing assembly end of the plate.

Terminal bent end 48 of second bottom plate 36 contacts and is rigidly secured to rear U-bolt bracket/axle seat 28 by welding, while terminal bent end 49 of first bottom plate 39 contacts and is rigidly secured to front U-bolt bracket/axle seat 28 by welding. As can be seen, by bending first bottom plate 39 and second bottom plate 36 in a manner so that ends 49 and 48 are oriented in the general direction of axle 17 at substantially the same relative angles, an axle locus 51 (FIG. 2A) is formed between arches 50 (only one shown) of sidewalls 66, U-bolt brackets/axle seats 28 and ends 49 and 48 of first and second bottom plates 39 and 36, respectively.

Because the prior art axle-to beam connection requires a pair of generally identical inboard and outboard connections for each suspension assembly 11, for purposes of clarity only the inboard connection of the suspension assembly will be described with the understanding that an identical outboard connection also exists for the same suspension assembly. U-bolt spacer 23 (FIG. 2A) is constructed such that it will contact an exposed lower portion of axle 17 and is disposed between the axle and U-bolt 27 to ensure a secure mating of the axle in locus 51. U-bolt 27 is placed around axle 17 and U-bolt spacer 23 (FIG. 2A) and through a pair of openings 72 formed in U-bolt bracket/axle seat 28. Each one of a pair of washers 52 (FIG. 2D) is disposed over a respective one of the pair of ends of U-bolt 27 and each one of a pair of nuts 73 is threadably engaged with a respective one of the pair of threaded ends of the U-bolt, and tightened. U-bolts 27 and their associated hardware, in addition to the welds (not shown) disposed between U-bolt bracket/axle seat 28 and axle 17, secure the axle into axle locus 51 to create a rigid axle-to-beam connection.

As shown in FIG. 2A, a shock absorber pivot plate 67 is secured to one of U-bolt brackets/axle seats 28 by suitable means (not shown). Shock absorber 7 is fastened to shock absorber pivot plate 67 such that the shock absorber pivots relative to beam 12. A height control valve 81 is attached to hanger 18 and is operatively connected to shock absorber pivot plate 67, via lever 82 and link 83. Air bag 9 is secured to main member 6 of slider 8 by threaded fastener connections 58 (FIG. 2) which are rigidly attached to the air bag, and which are threadably engaged by nuts 54. Air bag 9 is also secured to platform 16 by suitable fasteners 55 (FIG. 2D).

Having now described axle/suspension system 10 which includes overslung/top-mount beam 12 and that utilizes the prior art fourteen component axle-to-beam connection consisting of two U-bolts 27, two U-bolt brackets/axle seats 28, two U-bolt spacers 23, four washers 52 and four nuts 73, in addition to welds, an axle/suspension system 10' which includes an underslung/bottom-mount beam 12' and which utilizes the prior art axle-to-beam connection that consists of a pair of U-bolts 27', a pair of U-bolt brackets/axle seats 28', a pair of U-bolt spacers 23', two pairs of washers 52' and two pairs of nuts 73', will now be described immediately below.

Figure 3:
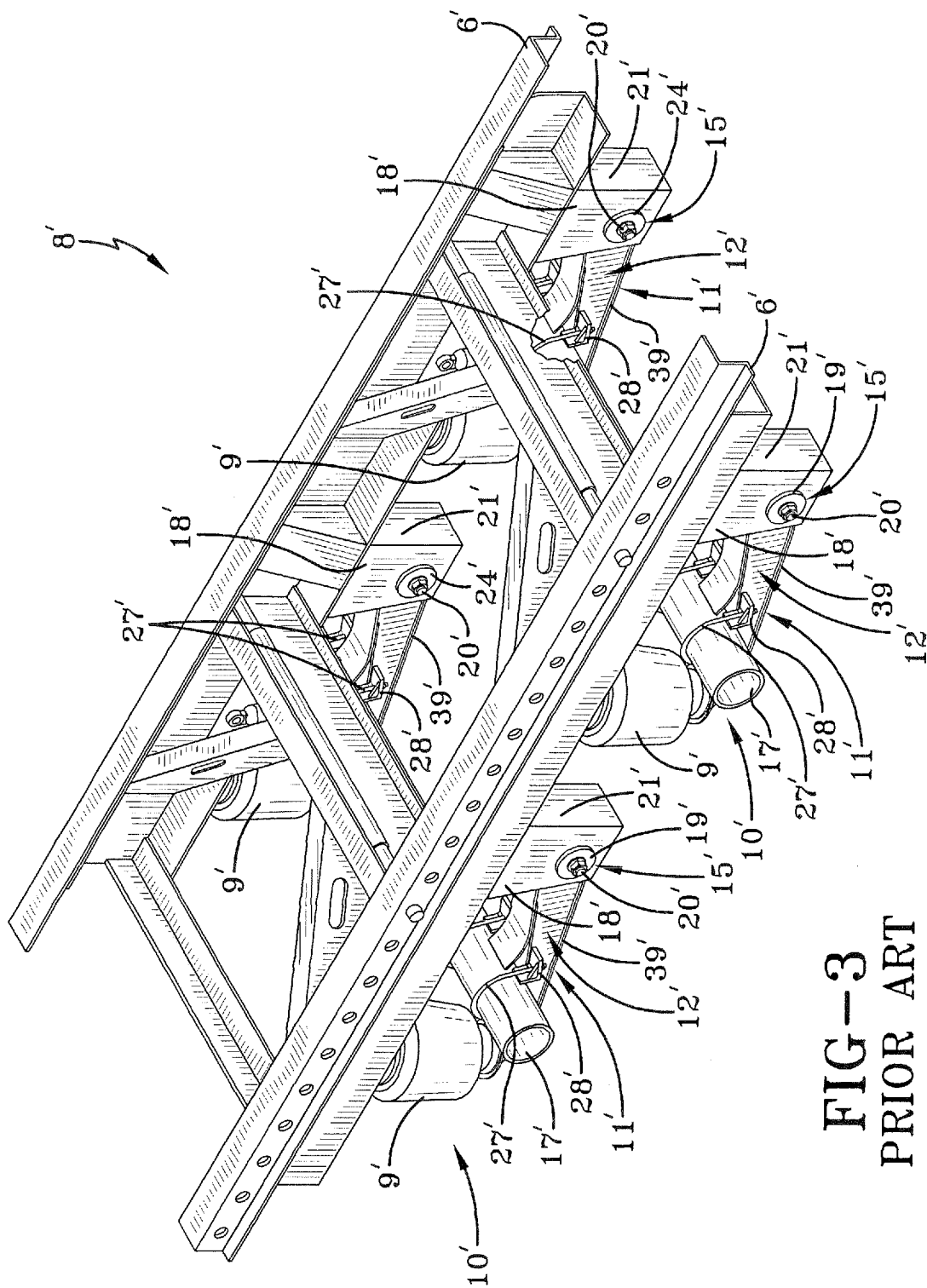
FIG. 3 is a top front curb-side perspective view of a slider for a tractor-trailer incorporating a pair of prior art trailing arm air-ride beam-type axle/suspension systems, showing the underslung/bottom-mount beams of each axle/suspension system capturing the axle utilizing prior art axle-to-beam connections including welds (not shown), U-bolts and U-bolt brackets/axle seats.

Turning now to FIG. 3, a pair of prior art air-ride trailing arm rigid underslung beam-type axle/suspension systems are indicated generally by reference numeral 10' and are shown incorporated into a slider 8' for a tractor-trailer. Axle/suspension system 10' is also the subject of U.S. Pat. No. 5,037,126, is available from the assignee of the present invention, and is commercially sold as the HT Series Suspension System. Inasmuch as slider 8' includes an identical pair of axle/suspension systems 10' mounted on the slider, only one of the axle/suspension systems will be described herein. Moreover, inasmuch as axle/suspension system 10' comprises an identical pair of suspension assemblies 11' mounted on a pair of transversely spaced frame hangers 18' depending from slider 8' for mounting an axle 17', only one of the suspension assemblies will be described herein.

Figure 4:
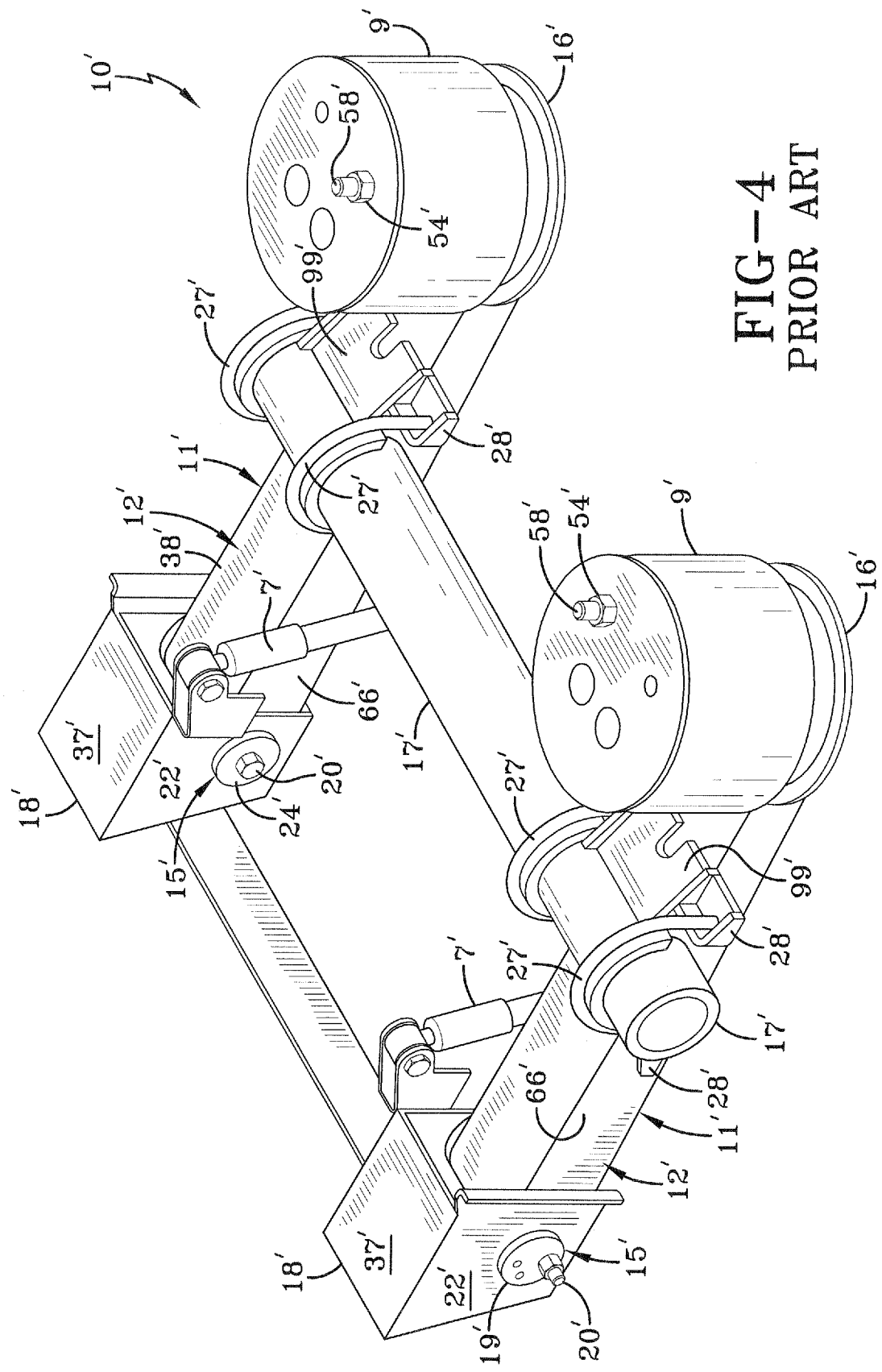
FIG. 4 is a top rear driver-side perspective view of one of the prior art axle/suspension systems shown in FIG. 3, pivotally attached to a pair of hangers, and showing each of the underslung/bottom-mount beams capturing the axle utilizing prior art axle-to-beam connections including welds (not shown), U-bolt and U-bolt brackets/axle seats.
Figure 4A:
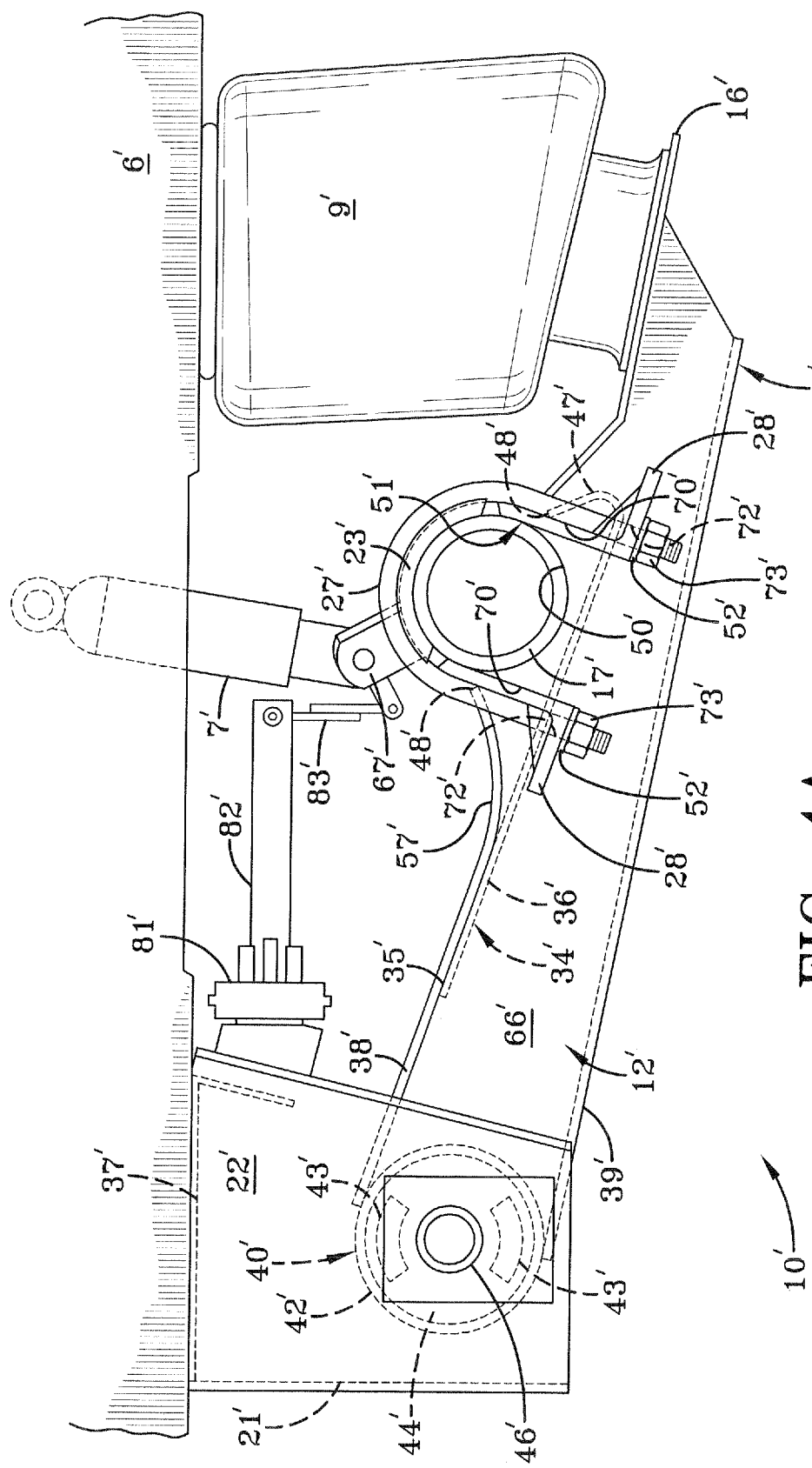
FIG. 4A is an elevational view of the prior art axle/suspension systems shown in FIG. 4, showing one of the pair of suspension assemblies mounted on a vehicle frame, with hidden portions represented by broken lines, and showing the underslung/bottom-mount beam connected to the axle utilizing prior art axle-to-beam connections including welds (not shown), U-bolt, U-bolt brackets/axle seats.

With additional reference to FIGS. 4 and 4A, suspension assembly 11' includes trailing arm or beam 12' which is a generally rigid metal box-like structure comprising a pair of transversely spaced vertically extending sidewalls 66', which are interconnected by horizontally extending top and bottom plates 38' and 39', respectively. Sidewalls 66' and bottom plate 39' are formed as a one-piece structure having a generally U-shape. Top plate 38' is welded to sidewalls 66' to complete the general structure of beam 12'. A more detailed description of beam 12' is set forth below. The front end of beam 12' includes bushing assembly 40' of a type which is well known in the heavy-duty axle/suspension system art. Bushing assembly 40' includes a mounting tube 42' formed of robust steel and an elastomeric bushing 44' press fit into the tube. Bushing 44' is molded about and adhesively attached to a central metal sleeve 46' formed with a continuous opening. Sleeve 46' passes completely through bushing 44' and extends outwardly from the sidewalls thereof for facilitating pivotal mounting of beam 12' on slider 8', which will be described in greater detail hereinbelow. As is well known in the art, the durometer of elastomeric bushing 44' can be varied depending on the application and the bushing deflection properties desired. To generally achieve a softer ride in the vertical direction and a stiffer ride in the fore-aft direction, bushing 44' is formed with a pair of vertically-spaced voids 43' in each of its sidewalls.

A platform 16' extends from the rear end of trailing beam 12' for supporting a conventional bellows-type air spring 9', which extends between and is attached to platform 16' and a main member 6' of slider 8' (FIGS. 3 and 4A). A shock absorber 7' also is attached to and extends between beam 12' and main member 6' of slider 8' at selected locations to complete the major components of suspension assembly 11'. Axle 17' extends between and is rigidly connected to the rear end of each beam 12' by welds (not shown) and structural components including U-bolts 27' and U-bolt brackets/axle seats 28', as will be described in greater detail below. U-bolt brackets/axle seats 28' are connected to inboard and outboard sidewalls 66' of beam 12' by conventional means well known in the art, such as welding. A rear angle plate 99' is attached to rear U-bolt bracket/axle seat 28' and to sidewalls 66' of the rear portion of beam 12' (FIG. 4).

Suspension assembly beam 12' is pivotally mounted on main member 6' of slider 8' via frame hanger 18' which depends from and is secured to the main member by any conventional means such as welds. Frame hanger 18' typically is a generally box-like sturdy steel structure having a vertically extending front wall 21' and a top wall 37' which are each attached to and extend between a pair of vertically extending sidewalls 22' (FIG. 4-4A). A fastener assembly 15' includes a bolt 20' which passes through an eccentric washer 19' and a washer 24', with the eccentric washer being located adjacent the outboard surface of outboard sidewall 22' of hanger 18' and washer 24' being located adjacent the inboard surface of inboard sidewall 22' of the hanger, a pair of aligned openings (not shown) formed in hanger sidewalls 22', a pair of aligned openings formed in a pair of conventional spacer discs (not shown), and the aligned continuous opening of bushing sleeve 46'. Each spacer disc typically is formed of ultrahigh molecular weight polyethylene, and is disposed about bushing mounting tube 42' between a respective one of hanger sidewalls 22' and bushing 44', to insulate against metal-to-metal contact between the mounting tube and the hanger sidewalls. Eccentric washer 19' provides a means for adjusting alignment of axle/suspension system 10'.

Turning now to FIGS. 4 and 4A, beam 12' generally comprises seven component parts, including sidewalls 66', integral bottom plate 39', first top plate 38', a second top plate 36', and U-bolt brackets/axle seats 28'. As set forth above, opposing sidewalls 66' and bottom plate 39' form a one-piece U-shaped member. This U-shaped member is formed by a stamping and/or bending process. First top plate 38' and second top plate 36' are secured together by welding along adjacent interface 35' to form a rigid beam top member 34'. Beam top member 34' is rigidly secured to the open end of the U-shaped member, and along sidewalls 66' and, thus, opposite and spaced from bottom plate 39'.

U-bolt brackets/axle seats 28' nest in and are rigidly secured to grooves 70' formed in opposing sidewalls 66' of beam 12', by welding. An inverted arch 50' (only one shown) is formed in the upper edge of each of sidewalls 66' between grooves 70'. Second top plate 36' is formed with a bend 47' adjacent an end 48' opposite from the bushing assembly end of the plate. First top plate 38' is also formed with a bend 57' adjacent an end 49' opposite from the bushing assembly end of the plate. Terminal bent end 48' of second top plate 36' contacts and is rigidly secured to rear U-bolt bracket/axle seat 28' by welding, while terminal bent end 49' of first top plate 38' contacts and is rigidly secured to front U-bolt bracket/axle seat 28' by welding. As can be seen, by bending first top plate 38' and second top plate 36' in a manner so that ends 49' and 48' are oriented in the general direction of axle 17' at substantially the same relative angles, an axle locus 51' (FIG. 4A) is formed between inverted arches 50' (only one shown) of sidewalls 66', brackets 28' and ends 49' and 48' of first and second top plates 38' and 36', respectively.

Because the prior art axle-to beam connection requires a pair of generally identical inboard and outboard connections for each suspension assembly 11', for purposes of clarity only the inboard connection of the suspension assembly will be described with the understanding that an identical outboard connection also exists for the same suspension assembly. U-bolt spacer 23' is disposed between axle 17' and U-bolt 27'. U-bolt spacer 23' (FIG. 4A) is constructed such that it will contact an exposed lower portion of axle 17' and is disposed between the axle and U-bolt 27' to ensure a secure mating of the axle in locus 51'. U-bolt 27' is placed around axle 17' and U-bolt spacer 23' (FIG. 4A) and through a pair of openings 72' formed in U-bolt bracket/axle seat 28'. Each one of a pair of washers 52' (FIG. 4A) is disposed over a respective one of the pair of ends of U-bolt 27' and each one of a pair of nuts 73' is threadably engaged with a respective one of the pair of threaded ends of the U-bolt, and tightened. U-bolts 27' and their associated hardware, in addition to the welds (not shown) disposed between U-bolt bracket/axle seat 28' and axle 17', secure the axle into axle locus 51' to create a rigid axle-to-beam connection.

With continued reference to FIG. 4A, a shock absorber pivot plate 67' is secured to one of U-bolt brackets/axle seats 28' by suitable means (not shown). Shock absorber 7' is fastened to shock absorber pivot plate 67' such that the shock absorber pivots relative to beam 12'. A height control valve 81' is attached to hanger 18' and is operatively connected to shock absorber pivot plate 67', via lever 82' and link 83'. Air bag 9' is secured to main member 6' of slider 8' by threaded fastener connections 58' (FIG. 4) which are rigidly attached to the air bag, and which are threadably engaged by nuts 54'. Air bag 9' is also secured to platform 16' by suitable fasteners (not shown).

As set forth above, prior art beams for axle/suspension systems that utilize conventional axle-to-beam connections such as U-bolts 27,27' and U-bolt brackets/axle seats 28,28', increase material, manufacturing and maintenance costs and also increase weight, all of which are undesirable in the heavy-duty vehicle industry. For example, the axle-to-beam connection for overslung/top-mount beam 12 of suspension assembly 11 of axle/suspension system 10 requires a pair of U-bolts 27, a pair of U-bolt brackets/axle seats 28, a pair of U-bolt spacers 23, two pairs of nuts 73, and two pairs of washers 52 for each axle-to-beam connection. Because there are two suspension assemblies 11, each one requiring an axle-to-beam connection, on each axle/suspension system 10, each axle suspension system requires two pairs of U-bolts 27, two pairs of U-bolt brackets/axle seats 28, two pairs of U-bolt spacers 23, four pairs of nuts 73 and four pairs of washers 52. Likewise, the axle-to-beam connection for underslung/bottom-mount beam 12' of suspension assembly 11' of axle/suspension system 10' requires a pair of U-bolts 27', a pair of U-bolt brackets/axle seats 28', a pair of U-bolt spacers 23', two pairs of nuts 73', and two pairs of washers 52' for each axle-to-beam connection. Because there two suspension assemblies 11', each one requiring an axle-to-beam connection, on each axle/suspension system 10', each axle suspension system requires two pairs of U-bolts 27', two pairs of U-bolt brackets/axle seats 28', two pairs of U-bolt spacers 23', four pairs of nuts 7Y and four pairs of washers 52'. Therefore, a need exists in the art for an improved axle-to-beam connection that can be utilized for both underslung and overslung beams of axle/suspension systems, which reduces cost and weight and provides a more robust axle-to-beam connection by broadening the area of axle support, and eliminating the need for U-bolts 27,27', U-bolt brackets/axle seats 28,28', U-bolt spacers 23, 23', washers 52,52' and nuts 73,73', which in turn would decrease weight and costs. Moreover, an improved axle-to-beam connection is needed that provides greater flexibility in orienting the S-cam of the axle/suspension system. Furthermore, an improved axle-to-beam connection is needed that improves manufacturing efficiencies over prior art axle-to-beam connections that utilize U-bolt 27,27', U-bolt brackets/axle seats 28,28' and the like. These problems are solved by the improved axle-to-beam connection for underslung and overslung beams of axle/suspension systems of the present invention, which will now be described in detail below.

Figure 6:
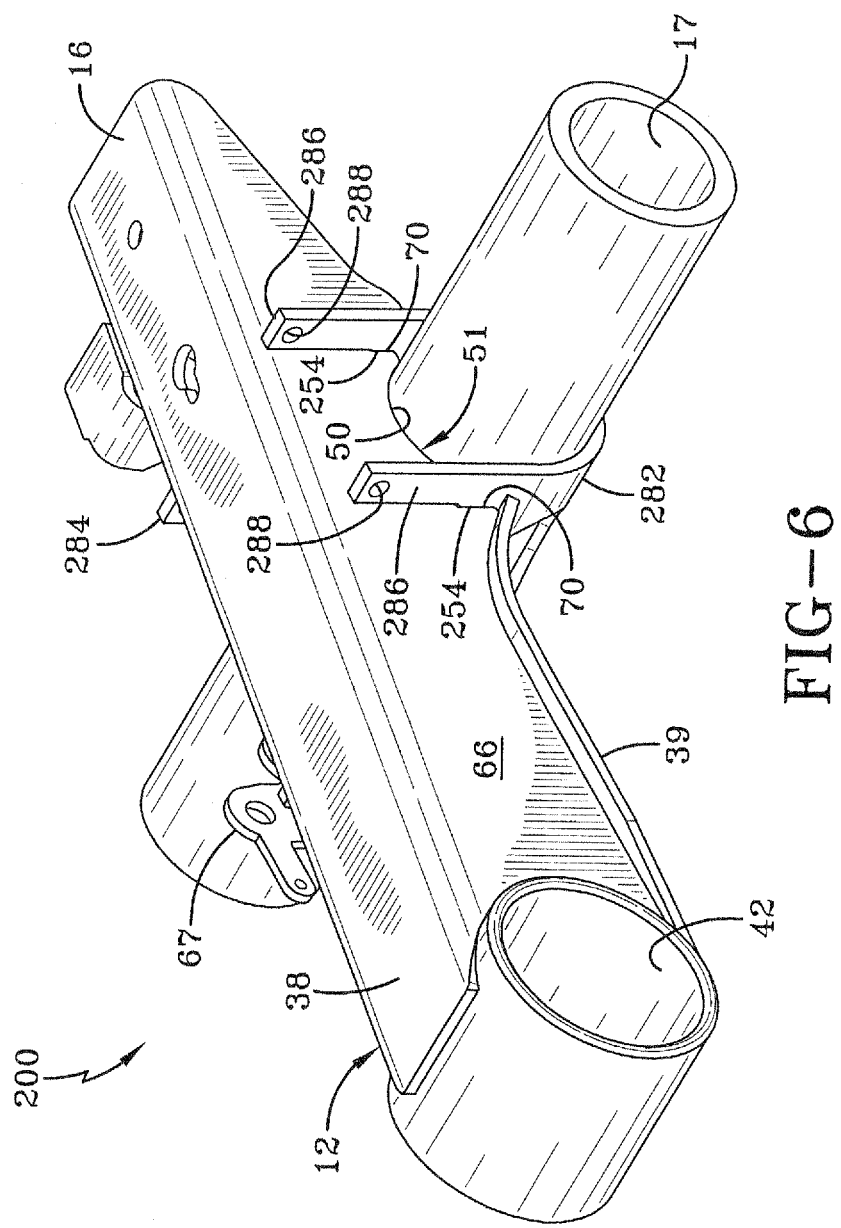
FIG. 6 is a top front outboard perspective view of the first preferred embodiment axle-to-beam connection for axle/suspension systems of the present invention shown in FIG. 5, showing the axle captured by the overslung/top-mount beam and the connector, and also showing the upwardly extending outboard legs of the connector attached to the outboard sidewall of the beam.

A first preferred embodiment axle-to-beam connection of the present invention is shown generally at 200 in FIGS. 5-7, is useful for top-mount/overslung beams 12 of axle/suspension systems 10, and now will be described below. As in prior art axle-to-beam connections that utilize U-bolts 27,27' and U-bolt brackets/axle seats 28,28', axle-to-beam connection 200 of the present invention is capable of being used in conjunction with both overslung/top-mount beams 12(first embodiment axle-to-beam connection 200) as well as underslung/bottom-mount beams 12' (second preferred embodiment axle-to-beam connection 300, described hereinbelow).

Axle-to-beam connection 200 of the present invention replaces prior art axle-to-beam connections, including U-bolts 27, U-bolt brackets/axle seats 28, U-bolt spacers 23, washers 52 and nuts 73, and is utilized with prior art overslung/top-mount beams 12 similar to that shown in FIGS. 1-2D. Axle-to-beam connection 200 of the present invention utilizes a single connector 282 to replace fourteen component parts including, two U-bolts 27, two U-bolt brackets/axle seats 28, two U-bolt spacers 23, four washers 52, and four nuts 73, which are used in the prior art axle-to-beam connections described above.

In accordance with an important feature of the present invention, axle-to-beam connection 200 of the present invention includes connector 282. Connector 282 has a generally U-shaped longitudinally-extending cross section and is formed from a generally rigid material such as steel. Connector 282 includes a pair of upwardly extending inboard legs 284 and a pair of upwardly extending outboard legs 286. Each of the upwardly extending inboard and outboard legs 284, 286, respectively, is formed with an opening 288 at its terminal end. Openings 288 are important because they provide a means for pulling connector 282 over axle 17 and beam 12 as described in the method of assembling axle-to-beam connection 200 below. Connector 282 is formed with a pair of window weld openings 290 (FIG. 7). Each window weld opening 290 is disposed adjacent to a lower quadrant of axle 17, or offset generally downwardly from horizontal centerline HCL (FIG. 7) of the axle, such that the horizontal centerline still intersects a portion of the window weld opening. Each window weld opening 290 is completely offset from vertical centerline VCL (FIG. 7) of axle 17 in order to avoid placement of the window weld openings at a location where loads are concentrated in both axle 17 and connector 282 during operation of the vehicle. Furthermore, window weld openings 290 are conveniently located to provide easy assembly of axle-to-beam connection 200 as set forth below. Another important aspect of axle-to-beam connection 200 of the present invention is the conforming fit of connector 282 to axle 17. More specifically, the conforming fit of connector 282 to axle 17 is accomplished due to the structure of connector 282 and the assembly process utilized in creating axle-to-beam connection 200 of the present invention, as will be described in detail below.

More specifically, assembly of axle-to-beam connection 200 includes placement of a pair of beams 12 into an axle locating fixture at the appropriate beam center. Axle 17 then is lowered into beams 12 using an overhead lifting device. More particularly, axle 17 is disposed into axle locus 51 formed between arch 50 of sidewalls 66, and ends 48,49 of first and second bottom plates 39,36, respectively (FIG. 7). A connector 282 is placed over each of the pair of axle-to-beam locations and nests in a pair of slots 70 formed in beam 12. A pulling means, such as a Porta-power device, is connected via bolts to openings 288 located in inboard and outboard legs 284,286, respectively, of connectors 282. The pulling means is activated to exert a straight line force on each of connectors 282, thus pulling each of the connectors in a downward direction, thereby conforming each of the connectors to axle 17. Welds (not shown) are laid along the length of front and rear junctions 254,255, respectively, between sidewalls 66 and inboard and outboard legs 284,286 of connector 282 (FIGS. 5-6). Welds (not shown) additionally are laid along junction 260 between first bottom plate 39 and connector 282 and also along junction 261 between second bottom plate 36 and connector 282. Continuous window welds (not shown) are laid along windows 290 at the junction of the windows and axle 17. As is evident from the assembly described above and shown in the drawings, connector 282 exhibits a conforming fit to axle 17 to minimize gaps between the connector and the axle, resulting in an improved axle-to-beam connection that efficiently reacts loads imparted on the axle/suspension system during operation of the vehicle. This is the case even though axle-to-beam connection 200 of the present invention has at least thirteen fewer component parts than the prior art axle-to-beam connections described above.

A second preferred embodiment of the axle-to-beam connection of the present invention is shown generally at 300 in FIGS. 8-10, is useful for underslung/bottom-mount beams 12' of axle/suspension systems 10', and now will be described in detail below.

Axle-to-beam connection 300 of the present invention replaces prior art axle-to-beam connections, including U-bolts 27', U-bolt brackets/axle seats 28', U-bolt spacers 23', washers 52' and nuts 73', and is utilized with prior art underslung/bottom-mount beams 12' similar to that shown in FIGS. 3-4A. Therefore, axle-to-beam connection 300 of the present invention utilizes a single connector 382 to replace fourteen component parts including, two U-bolts 27', two U-bolt brackets/axle seats 28', two U-bolt spacers 23', four washers 52' and four nuts 73', which are used in the prior art axle-to-beam connections described above.

In accordance with an important feature of the present invention, like first preferred embodiment axle-to-beam connection 200, second preferred embodiment axle-to-beam connection 300 of the present invention includes connector 382. Connector 382 has a generally inverted U-shaped longitudinally-extending cross section and is formed from a generally rigid material such as steel. Connector 382 includes a pair of downwardly extending inboard legs 384 and a pair of downwardly extending outboard legs 386. Each of the downwardly extending inboard and outboard legs 384,386, respectively, is formed with an opening 388 at its terminal end. Openings 388 are important because they provide a means for pulling connector 382 over the axle and beam during assembly of axle-to-beam connection 300, as will be described below. Connector 382 is formed with a pair of window weld openings 390 (FIG. 8). Each window weld opening 390 is disposed adjacent to an upper quadrant of axle 17', or offset generally upwardly from horizontal centerline HCL' (FIG. 8) of the axle, such that the horizontal centerline still intersects a portion of the window weld opening. Each window weld opening 390 is completely offset from vertical centerline VCL' (FIG. 8) of axle 17' in order to avoid placement of the window weld openings at a location where loads are concentrated in both axle 17' and connector 382 during operation of the vehicle. Furthermore, window weld openings 390 are conveniently located to provide easy assembly of axle-to-beam connection 300 as set forth below.

Another important aspect of axle-to-beam connection 300 of the present invention is the conforming fit of connector 382 to axle 17'. More specifically, the conforming fit of connector 382 to axle 17' is accomplished due to the structure of connector 382 and the assembly process utilized in creating axle-to-beam connection 300 of the present invention, as will be described in detail below.

More specifically, assembly of axle-to-beam connection 300 is similar to the procedure described above for first embodiment axle-to-beam connection 200, except that because connector 382 is being utilized in conjunction with underslung/bottom-mount beam 12', the connector is rotated approximately 180 degrees from that of connector 282 of the first preferred embodiment axle-to-beam connection. However, regardless of the specific direction in which connector 282,382 is being pulled, the general procedure as outlined above remains the same.

The process begins with placement of a pair of beams 12' into an axle locating fixture at the appropriate beam center. Axle 17' then is lowered into beams 12' using an overhead lifting device. More particularly, axle 17' is disposed into axle locus 51' formed between arch 50' of sidewalls 66', and ends 48',49' of first and second top plates 38',36', respectively, and rear angle plate 99' (FIGS. 8-9). A connector 382 is placed over each of the pair of axle-to-beam locations and nests in a pair of slots 70' formed in beam 12'. A pulling means, such as a Porta-power device, is connected via bolts to openings 388 located in inboard and outboard legs 384,386, respectively, of connectors 382. The pulling means is activated to exert a straight line force on each of connectors 382, thus pulling each of the connectors in a downward direction, conforming each of the connectors to axle 17'. Welds (not shown) are laid along the length of front and rear junctions 354,355, respectively, and between sidewalls 66' and inboard and outboard legs 384,386, respectively, of connector 382 (FIGS. 8-10). Welds (not shown) additionally are laid along junction 360 between first top plate 38' and connector 382 and also along junction 361 between rear angle plate 99' and connector 382. Continuous window welds (not shown) are laid along windows 390 at the junction of the windows and axle 17'. As is evident from the assembly described above and shown in the drawings, connector 382 exhibits a conforming fit to axle 17' to minimize gaps between the connector and the axle, resulting in an improved axle-to-beam connection that efficiently reacts loads imparted on the axle/suspension system during operation of the vehicle. This is the case even though axle-to-beam connection 300 of the present invention has at least thirteen fewer component parts than the prior art axle-to-beam connections described above.

It is understood that axle-to-beam connections 200,300 of the present invention, which utilize connectors 282,382, respectively, in order to replace the fourteen component parts that are utilized in certain prior art connections, generally function as part of beams 12,12', respectively.

As set forth above, axle-to-beam connections 200,300 of the present invention overcome the problems associated with prior art axle-to-beam connections which utilize U-bolts 27,27', U-bolt brackets/axle seats 28,28', U-bolt spacers 23,23', washers 52,52' and nuts 73,73', which problems include increased material costs and increased weight, by eliminating the need for the U-bolts, the U-bolt brackets/axle seats, the U-bolt spacers, the washers and the nuts, and the like, and replacing them with one-piece connector 282,382 which is capable of being used with both overslung and underslung beams 12,12' of axle/suspension systems, respectively, and that: reduces cost, labor/assembly time, maintenance and weight, and provides a more robust rigid axle-to-beam connection by broadening the area of axle support. Moreover, axle-to-beam connections 200,300 of the present invention provide greater flexibility in orienting the S-cam of the axle/suspension system because connectors 282,382 provide approximately ⅜ inch additional free space and/or clearance around axle 17, 17' over the prior art axle-to-beam connections that utilize U-bolts 27,27', U-bolt brackets/axle seats 28,28', U-bolt spacers 23,23', washers 52,52' and nuts 73,73, and moreover, the connectors are also capable of serving as a location on which to mount the S-cam bearing and/or the brake chamber. Furthermore, axle-to-beam connections 200, 300 of the present invention allow for more efficient manufacturing of the axle-to-beam connection because they include fewer parts than the prior art axle-to-beam connections that utilize U-bolts 27, 27', U-bolt brackets/axle seats 28,28' and the like. This increased manufacturing efficiency can potentially lead to increased manufacturing production and greater flexibility to utilize automated manufacturing processes, which can in turn potentially lead to an even greater increase in overall production. Axle-to-beam connections 200,300 of the present invention generally perform as well or better than prior art axle-to-beam connections that utilize U-bolts 27, 27', U-bolt brackets/axle seats 28,28' and the like, despite having thirteen fewer component parts.

It is contemplated that first and second embodiment axle-to-beam connections 200,300 of the present invention could be utilized on tractor-trailers or heavy-duty vehicles having one or more than one axle without changing the overall concept of the present invention. It is further contemplated that connectors 282,382 could be formed from one-piece or multiple pieces of material connected to or spaced from one another, without changing the overall concept of the present invention. It is even further contemplated that axle-to-beam connections 200,300 of the present invention could be utilized on vehicles having frames or subframes which are moveable or non-movable without changing the overall concept of the present invention. It is also contemplated that during the assembly of axle-to-beam connections 200,300 of the present invention, inboard and outboard legs 284,286, 384,386 could be pulled in a direction toward each other, so as to create a broader conforming fit interface between connectors 282,382 and axles 17,17', respectively. For example, inboard legs 284 of connector 282 could be pulled downwardly and toward one another around axle 17. Likewise, outboard legs 286 could be pulled downwardly and toward one another around axle 17. It is yet even further contemplated that legs 284,286,384,386 of axle-to-beam connections 200,300, respectively, of the present invention could be attached by welds or other fastening means such as bolts, adhesives, and the like without changing the overall concept or operation of the present invention. It is further contemplated that a single window weld opening 290,390 could be formed in axle-to-beam connections 200,300, respectively, of the present invention without changing the overall concept or operation of the present invention. It is even further contemplated that a single pair of front and rear legs 284,286,384,386 could be utilized in conjunction with axle-to-beam connections 200,300, respectively, arranged on the same or opposite sides of the beam without changing the overall concept or operation of the present invention. It is also contemplated that axle-to-beam connections 200,300 of the present invention could be utilized on all types of leading and/or trailing arm beam-type axle/suspension system designs known to those skilled in the art without changing the overall concept of the present invention. For example, the present invention finds application in beams or arms that are made of materials other than steel, such as aluminum, other metals, metal alloys, composites, and/or combinations thereof. The present invention also finds application in beams or arms with different designs and/or configurations than that shown above, such as solid beams, shell-type beams, truss structures, intersecting plates, spring beams and parallel plates.

Accordingly, the axle-to-beam connection of the present invention is simplified, provides an effective, safe, inexpensive and efficient structure and method which achieves all the enumerated objectives, provides for eliminating difficulties encountered with prior art axle-to-beam connections, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the axle-to-beam connection of the present invention is used and installed, the characteristics of the construction, arrangement and method steps, and the advantageous, new and useful results obtained; the new and useful structures, devices, elements, arrangements, process, parts, components and combinations are set forth in the appended claims.

What is claimed is:

1. An axle-to-beam connection for an axle/suspension system comprising:
   a) an axle;
   b) a beam; and
   c) a connector disposed about said axle and formed with at least one window weld opening adjacent said axle, said at least one window weld opening being generally offset from a horizontal centerline of said axle on a side of said horizontal centerline opposite said beam, said connector attached to the axle via a weld disposed along an interface between said window weld opening and said axle, said connector including at least a first leg and a second leg, said first leg disposed generally adjacent a front portion of said axle, said second leg disposed generally adjacent a rear portion of said axle, each one of said first and second legs being attached directly to said beam.

2. The axle-to-beam connection for an axle/suspension system of claim 1, said connector further comprising a third leg and a fourth leg, said third leg disposed generally adjacent said front portion of said axle, said fourth leg disposed generally adjacent said rear portion of the axle, each one of said third and fourth legs being attached directly to said beam.

3. The axle-to-beam connection for an axle/suspension system of claim 1, said at least one window weld opening comprising a pair of window weld openings.

4. The axle-to-beam connection for an axle/suspension system of claim 1, further comprising said first leg being attached to an outboard side of said beam.

5. The axle-to-beam connection for an axle/suspension system of claim 4, further comprising said second leg being attached to an inboard side of said beam.

6. The axle-to-beam connection for an axle/suspension system of claim 1, said at least one window weld opening being generally offset from a vertical centerline of said axle.

7. The axle-to-beam connection for an axle/suspension system of claim 1, said beam further comprising an overslung/top-mount beam.

8. The axle-to-beam connection for an axle/suspension system of claim 1, said beam further comprising an underslung/bottom-mount beam.

9. The axle-to-beam connection for an axle/suspension system of claim 1, further comprising said axle having a generally tubular shape.

10. The axle-to-beam connection for an axle/suspension system of claim 9, further comprising said connector having a generally U-shaped cross section.

11. The axle-to-beam connection for an axle/suspension system of claim 9, said connector longitudinally extending beyond inboard and outboard sides of said beam.

12. The axle-to-beam connection for an axle/suspension system of claim 1, said first and second legs each being formed with an opening for pulling said connector onto said axle in order to create a conforming fit between said connector and said axle.

13. The axle-to-beam connection for an axle/suspension system of claim 1, said beam further comprising at least one slot, said connector being disposed into said slot.

14. A method for forming an axle-to-beam connection for an axle/suspension system, comprising the following steps:
   a) placing an axle into an axle locus formed in a beam;
   b) placing a connector over said axle at said beam axle locus;
   c) pulling said connector onto said axle and said beam to create a conforming fit between said axle and said connector;
   d) attaching said connector directly to said beam;
   e) said connector including at least one window weld opening, said at least one window weld opening being generally offset from a horizontal centerline of said axle on a side of said horizontal centerline opposite said beam; and
   f) attaching said connector to said axle via a weld disposed along an interface between said window weld opening and the axle.

15. The method for forming an axle-to-beam connection for an axle/suspension system of claim 14, said connector including at least a first leg and a second leg, said first leg disposed generally adjacent a front portion of said axle, said second leg disposed generally adjacent a rear portion of the axle, said attaching of the connector directly to said beam is via attachment of each one of said first and second legs to the beam.

* * * * *